United States Patent [19]
Thompson et al.

[11] Patent Number: 5,780,848
[45] Date of Patent: Jul. 14, 1998

[54] SYSTEM AND METHOD FOR INDICATING AN ANGULAR POSITION OF AN OBJECT USING A LEVEL DETECTION DEVICE

[75] Inventors: Danny L. Thompson; Jeanine L. Thompson, both of Mesa, Ariz.

[73] Assignee: Motorola, Inc., Schaumburg, Ill.

[21] Appl. No.: 757,603

[22] Filed: Nov. 29, 1996

[51] Int. Cl.$^6$ .................................................. G01C 9/24
[52] U.S. Cl. .................................. 250/231.13; 33/366
[58] Field of Search ................... 250/231.13; 33/1 PT, 33/351, 353, 366, 377–379; 356/138

[56] References Cited

U.S. PATENT DOCUMENTS

| | | | |
|---|---|---|---|
| 3,822,944 | 7/1974 | Hopkins et al. | 33/366 |
| 5,101,570 | 4/1992 | Shimura | 33/366 |
| 5,317,810 | 6/1994 | Isono et al. | 33/366 |

FOREIGN PATENT DOCUMENTS

| | | |
|---|---|---|
| 2925710 | 1/1981 | Germany. |
| 3144250 | 5/1983 | Germany. |

Primary Examiner—Stephone B. Allen
Attorney, Agent, or Firm—Eugene A. Parsons

[57] ABSTRACT

A system for indicating an angular position of an object includes a photoemitter (205) producing radiation. A level detection device (210) contains a movable body (220) in a medium (215) occupying a location dependent on a gravitational angle of the object. The movable body (220) has a different degree of absorption than the medium (215). A photodetector (235) positioned such that the level detection device (210) is between the photoemitter (205) and the photodetector (235) detects an amount of the radiation based on the location of the movable body (220). The amount of the radiation detected indicates the angular position of the object.

6 Claims, 1 Drawing Sheet

SYSTEM AND METHOD FOR INDICATING AN ANGULAR POSITION OF AN OBJECT USING A LEVEL DETECTION DEVICE

FIELD OF THE INVENTION

The present invention relates generally to optoelectronics.

BACKGROUND OF THE INVENTION

Conventionally, a number of different methods have been advanced for detecting and/or controlling the position of objects. A need exists for detecting and controlling the position of objects accurately, efficiently and cost-effectively.

DESCRIPTION OF THE PREFERRED EMBODIMENTS

Figure 1:
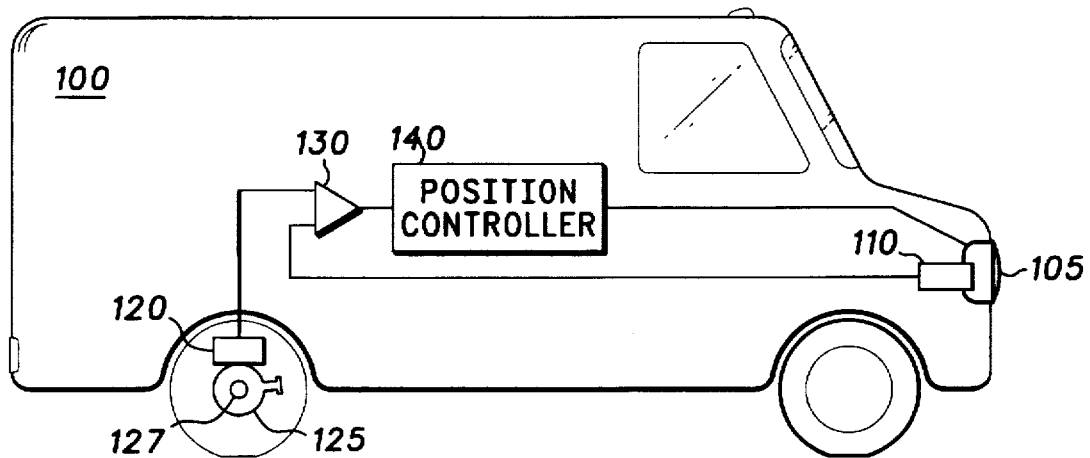
FIG. 1 is a simplified schematic diagram of an automobile to which the preferred embodiment of the invention is applied to detect and control the position of a headlight thereof.

In a preferred embodiment of the invention, a system and method is provided for indicating an angular position of an object. The preferred system includes a photoemitter producing radiation. The preferred system also includes a level detection device. The level detection device contains a movable body in a medium occupying a location dependent on a gravitational angle of the object. The movable body has a different degree of absorption than the medium. The preferred system additionally includes a photodetector positioned such that the level detection device is between the photoemitter and the photodetector. The photodetector detects an amount of the radiation based on the location of the movable body. The amount of the radiation detected indicates the angular position of the object.

The embodiment described herein also includes a position controller which controls the angular position of the object. The position controller adjusts the angular position of the object when the amount of radiation detected indicates the angular position has changed. In an application of the embodiment described herein, the object is an automobile headlight and the position controller adjusts the angular position of the headlight. In the embodiment that will be described, the photoemitter emits light, and the movable body has a different degree of transparency than the medium. In one embodiment, the movable body is a transparent bubble and the medium is an opaque fluid. In an alternative embodiment, the photoemitter also emits light, but the movable body is an opaque body and the medium is a transparent fluid.

Specifically, in the embodiment described herein, the preferred system includes a photoemitter array having one or more photoemitters, each producing radiation in the form of visible light. The system further includes a photodetector array having a number of photodetectors. The photodetector array is positioned such that the level detection device is between the photoemitter array and the photodetector array. Each of the photodetectors detects an amount of the radiation produced by the photoemitter array. A nearest photodetector to the movable body detects a different amount of the radiation than other photodetectors and provides a photodetector signal to the position controller. The position controller controls the angular position of the object based on the photodetector signal received from the photodetector array. Where the movable body is a transparent bubble and the medium is an opaque fluid, the nearest photodetector detects a greater amount of the light than the other photodetectors. Alternatively, where the movable body is an opaque body and the medium is a transparent fluid, the nearest photodetector detects a lesser amount of the light than the other photodetectors.

In a particularly preferred embodiment, there is a second photoemitter array, a second level detection device and a second photodetector array which produces a second photodetector signal. The position controller converts the first photodetector signal to a first position signal, converts the second photodetector signal to a second position signal, and controls the angular position of the object based on a difference between the first position signal and the second position signal. In the application of the particularly preferred embodiment described herein, the object is a headlight on an automobile with an axle and a differential connected to the axle. The first photoemitter array, the first level detection device and the first photodetector array are connected to the automobile near the headlight. The second photoemitter array, the second level detection device and the second photodetector array are mounted on the differential. The position controller adjusts the angular position of the headlight based on the difference in the first position signal and the second position signal, which represents a variance in the angular position of the automobile and the differential.

The preferred embodiments of the invention described herein provide the advantages of indicating and controlling the angular position of an object accurately, efficiently and cost-effectively. The preferred embodiment has a number of valuable applications in addition to the adjustment of an automobile headlight as discussed above. Such applications may include, but are not limited to, manufacturing tools and surfaces, building and road construction, mining, excavation, agricultural equipment, mobile homes, fire and emergency vehicles, and so on.

FIG. 1 is a simplified schematic diagram of an automobile to which the preferred embodiment of the invention is applied to detect and control the position of a headlight on an automobile. In FIG. 1, an automobile 100 contains a headlight 105 and a first level detector 110 which is connected to or positioned near the headlight 105 to detect the position of the headlight. The first level detector 110 detects an angular position of the headlight 105 based on a gravitational angle of the first level detector 110, and thus the gravitational angle of the headlight, with respect to the gravitational force of the Earth. A second level detector 120 is connected to a differential 125 of the automobile 100, or to some other static portion of the automobile assembly. The differential 125 is connected to a rear axle 127 of the automobile 100. The second level detector 120 detects an angular position of the differential 125 based on the gravitational angle of the second level detector 120. The angular position of the differential 125 or other static portion of the automobile assembly remains essentially the same as the road, whereas the angular position of the headlight varies based on the load placed on the automobile 100 in different locations. For example, if the trunk of the automobile 100 is heavily loaded, the body of the automobile 100 will be tilted to an upward angle which causes the headlights to shine upward. This endangers drivers and passengers of approaching automobiles. The preferred embodiment detects the difference between the angle of the headlights and the angular position of the differential 125 and adjusts the angular position of the headlights accordingly.

A position difference generator 130 is connected to the first level detector 110 and the second level detector 120. The first level detector 110 provides a first position signal indicating the angular position of the headlight based on the gravitational angle of the first level detector 110. Likewise, the second level detector 120 provides a second position signal indicating the angular position of the differential 125 based on the gravitational angle of the second level detector 120. The position difference generator 130 determines a difference between the first position signal and the second position signal and outputs a difference signal representing the difference determined. The difference represents a variance between the angular position of the differential 125 and the angular position of the headlight. The position difference generator 130 is implemented with, for example, a differential amplifier in an implementation where the first position signal and second position signal are analog signals, or a comparator in an implementation where the first position signal and the second position signal are digital signals.

The position difference generator 130 provides the difference signal to a position controller 140 which controls the position of the headlight. The position controller 140 is implemented, for example, with a stepper motor or linear motor which adjusts the angle of the headlight 105 based on the magnitude of the difference signal. One of ordinary skill in the art will readily implement the position controller 140 most suitable to the circumstances at hand, based on the general description herein, and will recognize a variety of possible implementations. When the difference signal indicates that the gravitational angle of the first level detector 110 and the second level detector 120 vary by a certain amount, the position controller 140 adjusts the level of the headlight to the degree necessary to offset the variance. For example, if the trunk of the automobile 100 is loaded down such that the headlights shine upward, the position controller 140 adjusts the headlight 105 back to a level that would exist under a normal load. It is noted that the position controller 140 could control the headlights on both sides of the automobile 100 based on the difference signal provided by the position difference generator 130. Alternatively, an additional level detection system such as the system described above could be implemented on the other side of the automobile 100.

Figure 2:
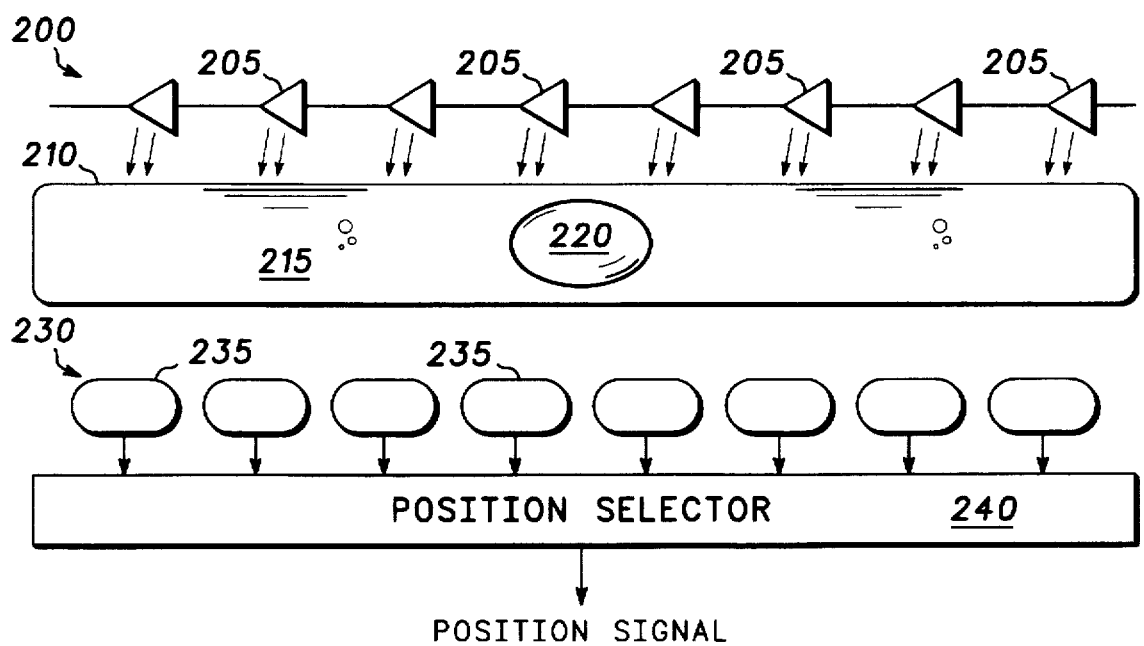
FIG. 2 is a simplified schematic diagram of a level detector provided in accordance with the preferred embodiment.

FIG. 2 is a simplified schematic diagram of a level detector provided in accordance with the preferred embodiment. The level detector shown in FIG. 2 corresponds to both the first level detector 110 and the second level detector 120 in FIG. 1. It is noted, however, that the level detector shown in FIG. 2 can be implemented in a variety of applications to indicate the angular position of an object or surface. Similarly, such an object or surface can be adjusted based on a single position signal provided by the level detector or a difference signal corresponding to the two level detectors as discussed above, utilizing a position controller 140 or other device for controlling the position of an object. One of ordinary skill in the art will readily implement such a system in a variety of applications. Such applications may include but are not limited to manufacturing tools and surfaces; building construction and road construction; mining and excavation; motor homes or mobile homes which are immobilized for use; agricultural equipment for leveling fields; fire and emergency vehicles which support extension ladders and other rescue devices, and so on.

The level detector shown in FIG. 2 includes a photoemitter array 200 which has a number of photoemitters 205 arranged in a first linear row with an approximately linear alignment. The photoemitter array 200 is closely located on one side of a level detection device 210. Each photoemitter 205 emits light in the direction of the level detection device 210. The level detection device 210 has a chamber which contains an opaque liquid 215 with a transparent bubble 220 that moves within the opaque liquid 215 along an axis which is essentially parallel to the photoemitter array 200. The transparent bubble 220 occupies a position in the chamber which varies with a gravitational angle of the level detection device 210. The gravitational angle of the level detection device 210 is the angle, relative to the direction of gravitational force from the earth, of the axis along which the transparent bubble 220 moves. For example, when the level detection device 210 is positioned such that the axis is perfectly level, or perpendicular to the gravitational force of the earth, then the transparent bubble 220 moves to the center of the chamber. Otherwise, the transparent bubble 220 moves to a position towards the end of the chamber with the highest altitude. The level detection device 210 can be implemented based on a design consistent with a simple carpenter's level, or other device, which one of ordinary skill in the art will readily implement corresponding to the circumstances at hand.

The level detector of FIG. 2 further includes a photodetector array 230 which has a number of photodetectors 235 arranged in a second linear row with an approximately linear alignment. The axis along which the transparent bubble 220 moves is essentially parallel to the first linear row and the second linear row. The photodetector array 230 is closely located to the level detection device 210. The strength of the photoemitters 205 and the sensitivity of the photodetectors 235 are set such that a photodetector 235 will only detect light which is directed towards, and thus essentially passes through, the transparent bubble 220 and will not detect light which is directed towards any other part of the opaque liquid 215. Thus, the gravitational angle of the level detection device 210, or of the axis within, is detected based on which photodetector or photodetectors 235 detect the light emitted by the photoemitter array 200.

The photodetector or photodetectors 235 which detect the light provide a photodetector signal to a position selector 240. Each photodetector 235 is connected to the position selector 240 by a separate line. The position selector 240 is implemented with, for example, an encoder which determines which line the photodetector signal is received from and encodes it into a value which uniquely identifies the one or more photodetectors 235 from which the photodetector signal is received, and thus identifies the position of the transparent bubble 220. One of ordinary skill in the art will readily implement a position selector 240 in this or a variety of ways, as appropriate, based on the description herein.

The position selector 240 outputs a position signal which represents the value determined. Thus, the position signal identifies the position of the transparent bubble 220 and, as a result, the gravitational angle of the level detector. In this way, in the headlight application described above, the first level detector 110 and the second level detector 120 indicate the angular position of the headlight and the differential 125, respectively. In an alternative embodiment, the level detection device 210 contains a medium other than the opaque liquid 215, such as a transparent liquid, and the medium contains a movable body other than the transparent bubble 220, such as an opaque body which blocks the light. In this alternative embodiment, the position selector 240 thus produces a position signal based on the only photodetector or photodetectors 235 which do not detect light, indicating the position of the movable body and, as a result, the angular position of the object. In either an embodiment where the photoemitters 205 and photodetectors 235 emit and detect visible light or radiation of a different wavelength, the medium and movable object have a different degree of absorption which is detected by the photodetector array.

The present invention has been described above with reference to preferred embodiments. However, those skilled in the art will recognize that changes and modifications may be made in these preferred embodiments without departing from the scope of the present invention. Changes and modifications which are obvious to those skilled in the art are intended to be included within the scope of the present invention.

What is claimed is:

1. A system for controlling an angular position of an object, comprising:

a photoemitter array having one or more photoemitters, each producing radiation;

a level detection device containing a medium and having a movable body within the medium, the movable body occupying a location dependent on a gravitational angle of the object and having a different degree of absorption than the medium, the movable body including a transparent bubble and the medium including an opaque fluid;

a photodetector array having a plurality of photodetectors and positioned such that the level detection device is between the photoemitter array and the photodetector array, each of the plurality of photodetectors detecting an amount of the radiation produced by the photoemitter array, a nearest photodetector to the movable body detecting a different amount of the radiation than other photodetectors of the plurality of photodetectors, and the nearest photodetector detecting a greater amount of the light than other photodetectors in the photodetector array and producing a photodetector signal; and a position controller, coupled to the photodetector array and to the object, and controlling the angular position of the object based on the photodetector signal received from the photodetector array.

2. A system for controlling an angular position of an object, comprising:

a photoemitter array having one or more photoemitters, each producing radiation;

a level detection device containing a medium and having a movable body within the medium, the movable body occupying a location dependent on a gravitational angle of the object and having a different degree of absorption than the medium, the movable body including an opaque bubble and the medium including a transparent fluid;

a photodetector array having a plurality of photodetectors and positioned such that the level detection device is between the photoemitter array and the photodetector array, each of the plurality of photodetectors detecting an amount of the radiation produced by the photoemitter array, a nearest photodetector to the movable body detecting a different amount of the radiation than other photodetectors of the plurality of photodetectors, and the nearest photodetector detecting a lesser amount of the light than other photodetectors in the photodetector array and producing a photodetector signal; and a position controller, coupled to the photodetector array and to the object, and controlling the angular position of the object based on the photodetector signal received from the photodetector array.

3. A system for controlling an angular position of an object, comprising:

a photoemitter array having a plurality of photoemitters aligned in a first linear row, each producing radiation;

a level detection device containing a medium and having a movable body within the medium, the movable body occupying a location dependent on a gravitational angle of the object and having a different degree of absorption than the medium;

a photodetector array having a plurality of photodetectors arranged such that the plurality of photodetectors are aligned in a second linear row and the level detection device is positioned between the photoemitter array and the photodetector array such that the movable body is movable along an axis essentially parallel to the first linear row and the second linear row, each of the plurality of photodetectors detecting an amount of the radiation produced by the photoemitter array, a nearest photodetector to the movable body detecting a different amount of the radiation than other photodetectors of the plurality of photodetectors, the nearest photodetector producing a photodetector signal; and a position controller, coupled to the photodetector array and to the object, and controlling the angular position of the object based on the photodetector signal received from the photodetector array.

4. The system of claim 3, further comprising a position selector converting the photodetector signal from one or more of the plurality of photodetectors to a position signal, the position controller controlling the angular position of the object based on the position signal.

5. A system for controlling an angular position of an object comprising:

a first photoemitter array having one or more photoemitters, each producing radiation;

a first level detection device containing a medium and having a movable body within the medium, the movable body occupying a location dependent on a gravitational angle of the object and having a different degree of absorption than the medium;

a first photodetector array having a plurality of photodetectors and positioned such that the first level detection device is between the first photoemitter array and the first photodetector array, each of the plurality of photodetectors detecting an amount of the radiation produced by the first photoemitter array, a nearest photodetector to the movable body detecting a different amount of the radiation than other photodetectors of the plurality of photodetectors, the nearest photodetector producing a first photodetector signal;

a second photoemitter array, a second level detection device and a second photodetector array, the second photodetector array producing a second photodetector signal, and the position controller being coupled to the first and second photodetector arrays and to the object, and the position controller converting the first photodetector signal to a first position signal, converting the second photodetector signal to a second position signal, and controlling the angular position of the object based on a difference between the first position signal and the second position signal.

6. The system of claim 5 wherein the object is a headlight on an automobile, the automobile having an axle and a differential coupled to the axle, and wherein the first photoemitter array, the first level detection device and the first photodetector array are coupled to the automobile near the headlight, the second photoemitter array, the second level detection device and the second photodetector array are mounted on the differential, and the position controller adjusts the headlight based on a difference in the first position signal and the second position signal representing a variance in the angular position of the automobile and the differential.

* * * * *